UNITED STATES PATENT OFFICE.

FRANK A. HAGER, OF PORTLAND, OREGON.

TIRE-FILLER.

1,276,349.  Specification of Letters Patent.  Patented Aug. 20, 1918.

No Drawing.  Application filed April 11, 1918.  Serial No. 228,012.

*To all whom it may concern:*

Be it known that I, FRANK A. HAGER, a citizen of the United States, residing at Portland, in the county of Multnomah and State of Oregon, have invented a new and useful Tire-Filler, of which the following is a specification.

This invention relates to a composition of matter for use as a tire filler and is more particularly an improvement upon the invention disclosed in Patent 1,174,856 issued to me on March 7th, 1916.

It is an object of the invention to reduce the cost of producing the filler, and to increase the resiliency and lasting qualities of the product.

With the foregoing and other objects in view the invention consists of the following ingredients substantially in the proportions given, to wit:—

| | |
|---|---|
| Soy bean oil | 24 pounds. |
| Chlorid of sulfur | 6 pounds. |
| Oxid of magnesium | 17½ ounces. |
| Venetian red | 3 ounces. |

The above mentioned ingredients are to be stirred for about five minutes until thoroughly mixed after which the mixture is poured into molds and allowed to stand. After the same has hardened it can be placed in a tire casing and used as a filler in lieu of air under pressure.

What is claimed is:—

A tire filler comprising the following ingredients substantially in the proportions stated, to wit, soy bean oil, twenty four pounds; chlorid of sulfur, six pounds; oxid of magnesium, seventeen and one-half ounces; and Venetian red, three ounces.

In testimony that I claim the foregoing as my own, I have hereto affixed my signature in the presence of two witnesses.

FRANK A. HAGER.

Witnesses:
 WM. DICKENSON,
 ELEANOR BRUCE.